(12) United States Patent
Cirani et al.

(10) Patent No.: US 8,896,175 B2
(45) Date of Patent: Nov. 25, 2014

(54) ROTOR OF AN ELECTRIC MACHINE WITH EMBEDDED PERMANENT MAGNETS AND ELECTRIC MACHINE

(75) Inventors: Maddalena Cirani, Göteborg (SE); Sture Eriksson, Västerås (SE)

(73) Assignee: Volvo Technology Corporation, Göteborg (SE)

( * ) Notice: Subject to any disclaimer, the term of this patent is extended or adjusted under 35 U.S.C. 154(b) by 246 days.

(21) Appl. No.: 13/637,510

(22) PCT Filed: Mar. 30, 2010

(86) PCT No.: PCT/SE2010/000080
§ 371 (c)(1),
(2), (4) Date: Sep. 26, 2012

(87) PCT Pub. No.: WO2011/122996
PCT Pub. Date: Oct. 6, 2011

(65) Prior Publication Data
US 2013/0026872 A1 Jan. 31, 2013

(51) Int. Cl.
*H02K 21/12* (2006.01)

(52) U.S. Cl.
USPC ................................ 310/156.08; 310/156.57

(58) Field of Classification Search
USPC .............. 310/156.08–156.22, 156.53–156.57
See application file for complete search history.

(56) References Cited

U.S. PATENT DOCUMENTS

| | | | |
|---|---|---|---|
| 4,393,320 A | 7/1983 | Anderson | |
| 4,476,408 A | 10/1984 | Honsinger | |
| 4,486,678 A * | 12/1984 | Olson | 310/156.28 |
| 4,916,346 A | 4/1990 | Kliman | |
| 5,771,566 A * | 6/1998 | Pop, Sr. | 29/598 |
| 6,888,270 B2 | 5/2005 | Reiter, Jr. et al. | |
| 2003/0085629 A1* | 5/2003 | Van Dine et al. | 310/156.08 |
| 2007/0024141 A1* | 2/2007 | Drexlmaier | 310/156.19 |
| 2007/0103024 A1* | 5/2007 | Nakayama et al. | 310/156.53 |
| 2008/0007131 A1* | 1/2008 | Cai et al. | 310/156.38 |
| 2008/0265706 A1* | 10/2008 | Nakayama et al. | 310/156.53 |
| 2009/0230803 A1* | 9/2009 | Nakayama et al. | 310/156.56 |

FOREIGN PATENT DOCUMENTS

| | | |
|---|---|---|
| EP | 1300208 A2 | 4/2003 |
| EP | 1990895 A2 | 11/2008 |

OTHER PUBLICATIONS

International Search Report for corresponding International Application PCT/SE2010/000080.

(Continued)

*Primary Examiner* — Thanh Lam
(74) *Attorney, Agent, or Firm* — WRB-IP LLP

(57) ABSTRACT

A rotor for an electric machine excited by magnetic poles formed by one or more embedded permanent magnets includes a magnetic body and the one or more embedded permanent magnets associated with the magnetic body defining first magnetic poles and second magnetic poles of alternating magnetic polarity along a rotor direction. For at least one of the one or more embedded permanent magnets a rotor segment is arranged between the one or more embedded permanent magnets and a first surface of the magnetic body. At least one retainer element connects the rotor segment to a portion of the magnetic body.

17 Claims, 11 Drawing Sheets

(56) References Cited

FOREIGN PATENT DOCUMENTS

| | | |
|---|---|---|
| JP | H11355985 A | 12/1999 |
| JP | 2002078259 A | 3/2002 |
| JP | 2002218683 A | 8/2002 |
| JP | 2003324920 A | 11/2003 |
| WO | 2005117235 A1 | 12/2005 |

OTHER PUBLICATIONS

International Preliminary Report on Patentability for corresponding International Application PCT/SE2010/000080.

Japanese Official Action (Mar. 14, 2014) (translation) for corresponding Japanese Application 2013-052521.

* cited by examiner

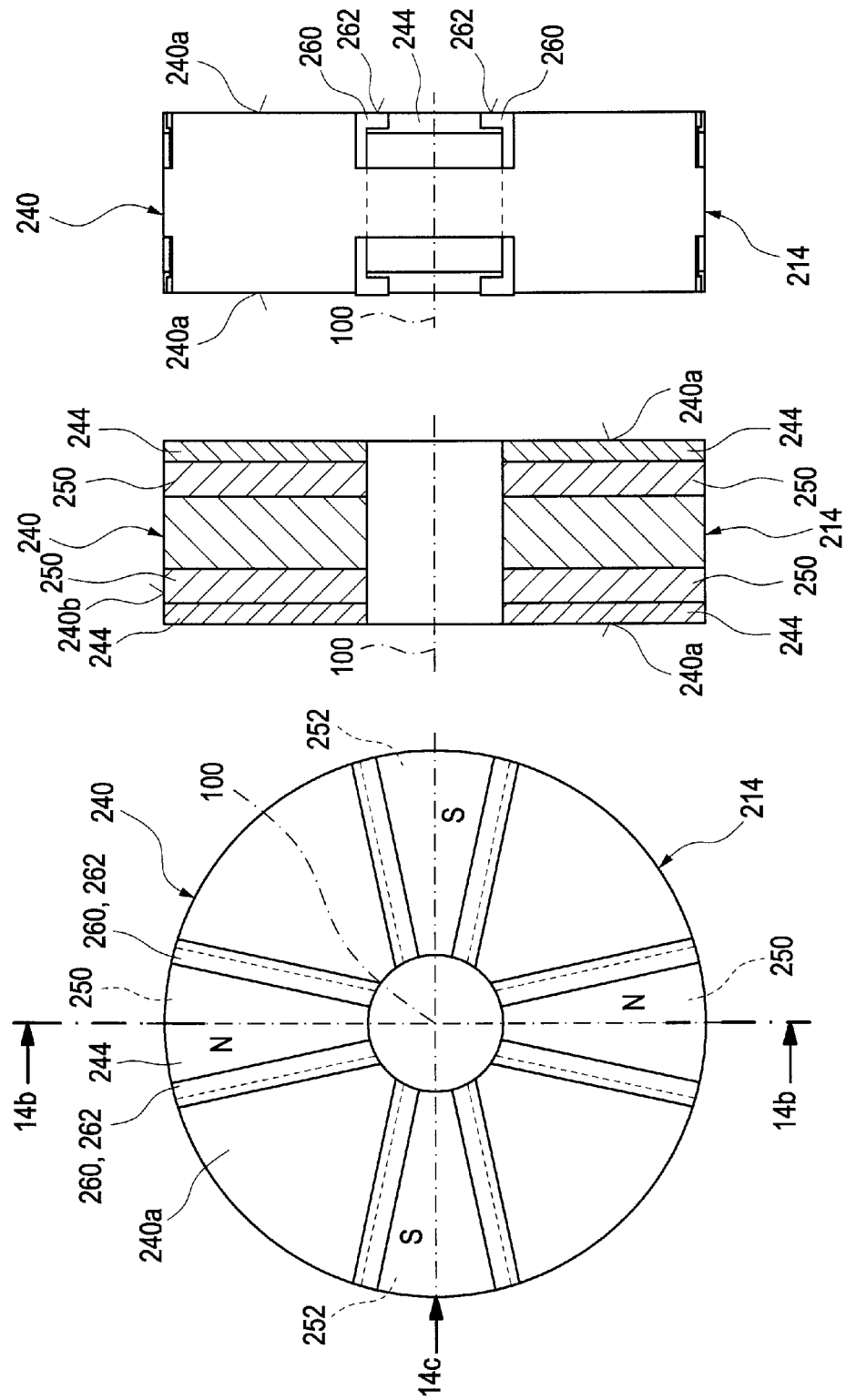

ROTOR OF AN ELECTRIC MACHINE WITH EMBEDDED PERMANENT MAGNETS AND ELECTRIC MACHINE

BACKGROUND AND SUMMARY

The invention relates to a rotor for an electric machine exited by magnetic poles formed by one or more embedded permanent magnets and to an electric machine exited by such a rotor comprising poles formed by one or more embedded permanent magnets.

Electric machines with permanent magnet (PM) rotors are known in the art. Such PM machines are employed as motors, as generators and as motor-generators. Various ways are known to integrate the permanent magnets in the rotor. PM machines comprising embedded permanent magnets are known to provide, among other things, higher saliency ratios, higher reluctance torque, increased protection against magnet demagnetization and, in case of internal rotor machines, the elimination of an external retaining sleeve around the rotor.

There are generally three types of PM machines rotor topologies known in the art: surface magnet, inset magnet and embedded (buried, interior) magnet rotor topology. In the surface magnet topology, the permanent magnets lie on the rotor lamination surface toward the air gap between rotor and stator in a spoke-like manner orthogonal to the air gap. Air fills the space between the permanent magnets. In the inset magnet topology the permanent magnets also face the air gap between rotor and stator in a similar fashion as for the surface magnet, but iron fills the gap between the magnets. In the third topology, the magnets are not placed in contact with the air gap, as in the previous cases, but they are inserted inside the rotor iron in different configurations. The conventional embedded PM machines utilize narrow bridges to secure the mechanical rotor structure. These bridges can be placed at the air gap or in between the magnets allowing the rotor to rotate at medium or high speeds but still there is usually some flux leakage left.

Slits and air spaces within the rotor lamination are utilized to substantially reduce the flux leakage that occurs in the iron bridges resulting in an improved machine performance.

U.S. Pat. No. 6,888,270 discloses a structurally robust rotor of an electric machine with embedded permanent magnets wherein magnetically non-conductive barrier elements are positioned between the ends of embedded permanent magnets, wherein the rotor is made from powder material.

It is desirable to provide an embedded permanent magnet (PM) rotor with improved performance and possibility to reduce weight compared to typical embedded permanent magnet rotors resulting in an improved machine performance while maintaining the advantages of embedded permanent magnets.

It is also desirable to provide an embedded permanent magnet (PM) electric machine with improved performance compared to a conventional PM electric machine with embedded permanent magnets given the same amount of utilized embedded permanent magnets while maintaining the advantages of embedded permanent magnets.

According to an aspect of the invention, a rotor is proposed for an electric machine excited by magnetic poles formed by one or more embedded permanent magnets, comprising a magnetic body and the one or more embedded permanent magnets associated with the magnetic body defining first magnetic poles and second magnetic poles of alternating magnetic polarity along a rotor direction, wherein for at least one of the one or more embedded permanent magnets a rotor segment is arranged between the one or more embedded permanent magnets and a first surface of the magnetic body. At least one retainer element connects the rotor segment to a portion of the magnetic body.

The rotor segment can be placed in a circumferential direction on a rotor shell for a radial flux machine or on a front face of the rotor for an axial flux machine or a longitudinal extension for a linear machine. Favourably, the retainer elements lock the embedded permanent magnets and the rotor segment directly or indirectly in the magnetic body. The retainer elements may be formed e.g. like wedges which, when seen from a cross section in case of a radial flux machine or from a side view in case of an axial flux machine, protrude in one or more recesses in the magnetic body, or having one or more recesses in which the magnetic body protrudes. For instance, when the retainer element abuts and locks a rotor segment but not the embedded permanent magnet itself, because of being arranged between the rotor segment and the main part of the magnetic body, the embedded permanent magnet will be indirectly locked when the rotor segment is directly locked to the magnetic body by the retainer element. The retainer elements can be advantageously arranged at one or more edges of the embedded permanent magnets. The retainer elements may include magnetically non-conductive areas. In the case of internal rotor design of a radial flux machine such retainer elements have expediently also high mechanical strength for bearing the load caused by centripetal forces. Favourably, the use of magnetically non conducting material can provide a reduction or even elimination of flux leakage.

The invention is applicable to any electric machine topology (e.g. inner and external rotor machines, radial flux machines with internal or external rotors, axial flux machines with internal or external rotors, linear machines, etc), to any kind of embedded rotor topology (e.g. with single embedded permanent magnets or multiple layered embedded permanent magnets, aligned or V-shaped embedded permanent magnet arrangements) and to any shape of permanent magnets (rectangular, breadloaf, etc). The rotor can be manufactured by laminated iron sheets axially stacked along a rotation axis of the rotor (typical for a radial flux machine) or wound around a rotation axis, i.e. stacked in radial direction (typical for an axial flux machine), iron powder material or other ferromagnetic material.

According to a favourable embodiment, a magnetically non-conductive area may be assigned to at least one of the one or more embedded permanent magnets.

Favourably, the retainer element may include the magnetically non-conductive area. In particular, the retainer element constitutes the magnetically non-conductive area. As a result, the shape of the magnetically non-conductive area can be determined by the shape of the retainer element. The retainer element can easily be adapted to required stiffness of the magnetic body of the rotor. For instance, the stiffness can be the same as the stiffness of the magnetic body or can be higher, as required for a desired layout of the rotor, usually considering the forces acting on the components during operation of the electric machine. As the result of the substitution of the rotor material, e.g. iron lamination, with another, magnetically non-conductive material the magnetic rotor loss might also be reduced.

In an advantageous embodiment, the at least one retainer element may lock the rotor segment and/or the one or more embedded permanent magnets by at least one of (i) form locking (ii) frictional locking and/or (iii) the retainer element may be integrally joined with the rotor segment. Favourably, the at least one retainer element can stabilize the position of the rotor segment. A stable arrangement of the embedded permanent magnets and the rotor segment can be achieved.

Additionally or alternatively, the retainer element may engage one or more recesses in the embedded permanent magnet and/or the rotor segment.

According to a favourable embodiment, particularly for a radial flux machine, the rotor segment and/or at least one of the embedded permanent magnets may be fixed in a radial position by the at least one retainer element. The retainer element can be arranged generally inside the magnetic body or, alternatively, at least partially outside the magnetic body.

Favourably, in a radial flux machine the one or more embedded permanent magnets may be arranged alternately in a circumferential direction at the magnetic body and defining first magnetic poles and second magnetic poles of alternating magnetic polarity in the circumferential direction and/or that the rotor segment may be arranged in a substantially radial direction between the one or more embedded permanent magnets and the first surface of the magnetic body. The at least one retainer element can easily be adapted to an actual rotor design of an electric machine. Advantageously, a stable arrangement of embedded permanent magnets and rotor segments on the rotor can be established even at high rotational speeds of the rotor as well as at high forces generated by high electric currents in the stator coils. Favourably, the first surface of the magnetic body is provided for facing a stator. In case of an internal rotor the first surface is the outer surface of the rotor. In case of an external rotor, the first surface is the inner surface of the rotor. Particularly, the first surface is the shell surface at the outside of the rotor (in case of the rotor is provided for being surrounded by the stator) or the shell surface at the inside of the rotor (in case the rotor is provided for surrounding the stator).

Generally, for all types of electrical machines and rotors, the at least one retainer element can be arranged on both the external sides of each embedded permanent magnet and/or each magnet pole. The purpose of the retainer element is to lock the rotor segment and the permanent magnet and keep them fixed in a position as well as, when comprising magnetically non-conductive areas, to reduce or eliminate flux leakage. In the case of external rotor design of a radial flux machine, where a stator is surrounded by the rotor, the rotor segments and embedded permanent magnets are arranged at the inside of the rotor, provided for facing the stator. As centrifugal forces are directed to the outside of the rotor, the centrifugal forces act on the embedded permanent magnets and/or rotor segments in a way to stabilize their radial positions. As a result, the purpose of the retainer element in such an external rotor arrangement is mainly to reduce or eliminate flux leakage.

According to a favourable embodiment, particularly for a rotor for a radial flux machine, one or more embedded permanent magnets may be stacked in radial direction of the magnetic body with a radial distance to each other. This is particularly of advantage for rotor for a radial flux machine with multilayered embedded permanent magnets. In one arrangement with multilayered embedded permanent magnets, an embedded permanent magnet is sandwiched between two rotor segments in radial direction wherein two or more embedded permanent magnets can be provided each sandwiched between rotor segments. Retainer elements can be arranged at the sides of the embedded permanent magnets and/or the rotor segments, each locking the embedded permanent magnet and/or the rotor segments in its/their position in the magnetic body. A retainer element can be arranged between two embedded permanent magnets, and/or at each of the opposite outer ends of the embedded permanent magnets, depending on the desired design of the rotor. In another arrangement, retainer elements can be arranged only at the outer edges of the embedded permanent magnets in the circumferential direction.

According to a favourable embodiment, particularly for a rotor for an axial flux machine, the rotor segment and/or at least one of the embedded permanent magnets may be fixed in an axial position by the at least one retainer element. This is advantageous for a rotor for an axial flux machine. The rotor segment is securely fastened independent on an inclination of the electric machine.

According to a favourable embodiment, particularly for a rotor for an axial flux machine, the one or more embedded permanent magnets may be arranged alternately in at least one front face of the magnetic body and defining first magnetic poles and second magnetic poles of alternating magnetic polarity on the front face of the magnetic body. The rotor segments may be arranged in a substantially axial direction between the one or more embedded permanent magnets and the first surface of the magnetic body. The rotor segment is securely fastened in the axial direction independent of the orientation of the electric machine during use. A proper shape of the retainer element together with high mechanical strength could secure the embedded permanent magnet position also in the radial direction, even at a high rotational speed of the rotor.

In another advantageous embodiment, the at least one retainer element may have an outer edge arranged flush with the first surface of the magnetic body. The surface of the rotor can easily be trimmed during manufacturing.

In an alternative embodiment, the retainer element can be arranged non-flush with said first surface. In such an arrangement the retainer element sticks out from the magnetic body towards the air gap. This solution can also improve the cooling in the air gap as the protruding parts can act like vanes of a fan.

Further, as a result of the outer edge of the retainer element arranged flush with the first surface of the magnetic body, magnetic losses caused by magnetic flux quenched in a portion of the magnetic body between the magnetically non-conductive area and the first surface of the magnetic body can be reduced, particularly if ceramic or other non-electrically conductive material is utilized instead of carbon fibre. Due to the overlap region the embedded permanent magnet is retained directly or indirectly in its radial position by the rotor segment in case of a rotor for a radial flux machine (even at high rotational speeds). The retainer element not only retains the embedded permanent magnet (and the rotor segment) in its position in the magnetic body but can also stabilize the embedded permanent magnet in order to avoid vibrations during rotation of the rotor as well as against forces acting on the embedded permanent magnet generated by electrical currents flowing in the stator windings. Favourably, it is possible to reduce deterioration of the rotor characteristics. For instance, in case tolerances are too high among the three different types of elements concerned, i.e. the embedded permanent magnets, the retainer elements and the lamination, unwanted gaps that might occur during manufacture of the rotor can be filled with epoxy added to the rotor body.

Expediently, the retainer element(s) can be arranged at an outer edge of one or more of the embedded permanent magnets. Thus, the rotor segment may substantially cover an edge of the embedded permanent magnet. A reduction of the magnetic body's effective magnetic area and/or volume due to the introduction of the retainer elements should account for the tolerances of the different elements (components) in the design of the rotor.

It is of advantage if the embedded permanent magnet in the magnetic body can be provided with such a retainer element at each end of its extension in the circumferential direction of the rotor. The arrangement of the retainer element with respect to the embedded permanent magnet allows trimming the first surface of the magnetic body by removing material from the shell surface in order to provide a flush relationship of the retainer element with the first surface. Preferably, the first surface is provided for facing a stator. Expediently, each embedded permanent magnet arranged in the magnetic body of the rotor is provided with at least one rotor segment. It is expedient if all embedded permanent magnets in the rotor are provided with at least one retainer element, particularly on both free ends, e.g. both circumferential ends, of each embedded permanent magnet. The shape of the retainer element can be optimized in relation to desired magnetic parameters and mechanical strength of the rotor and may be adapted to the number, size and shape of the embedded permanent magnets, the radial position of the embedded permanent magnets and other design parameters determining the characteristics of the rotor.

An internally arranged retainer element can be provided if the at least one retainer element is arranged between two adjacent embedded permanent magnets. At the outer edges, it is possible to arrange further retainer elements or even to arrange air pockets. In the latter case, the weight of the rotor can be further reduced.

In an expedient embodiment, the at least one retainer element can be arranged in an axial slot in the magnetic body. Generally, retainer elements in the rotor can be made with identical cross sections. However, depending on the rotor design, retainer elements of different cross sections may also be used. However, retainer elements arranged at opposing ends of a magnet pole are usually of mirror-symmetric shape.

According to a favourable embodiment, the at least one retainer element may comprise at least one of carbon fibre, carbon fibre composites, glass fibre, glass fibre composites, polymer fibre, such as e.g. aramid fibre, polymer fibre composite, ceramics, plastics with mechanical strength similar or superior to the lamination. Particularly, the material may be a magnetically non-conductive material. The retainer element can be manufactured separately from the magnetic body or the embedded permanent magnet. As a result, the retainer element can be shaped according to the actual shape and/or arrangement of the embedded permanent magnet in the magnetic body of the rotor. Carbon fibre composite for instance is robust and has a low specific weight. Expediently, the retainer element made of carbon fibre composite can be configured to have reduced electrical conductivity, e.g. by depositing a material such as a varnish-polymer resin on the surface the retainer element.

According to another favourable embodiment, the at least one retainer element may abut a section of all outer contour of one or more embedded permanent magnets and/or may engage a recess in the embedded permanent magnet and/or in the magnetic body and/or in the rotor segment. Additionally or alternatively, the embedded permanent magnet and/or the magnetic body and/or the rotor segment may engage a recess in the retainer element. By such an interdigital or toothed arrangement of the retainer element in relation to the embedded permanent magnet and/or the magnetic body and/or the rotor segment, each said component can be directly or indirectly secured reliably in its radial position even at very high rotational speeds or high currents in the stator windings.

According to another favourable embodiment, the magnetic body can be made of stacked laminates. In this embodiment, openings for the embedded permanent magnets and retainer elements can easily be manufactured by punching from sheet material. This manufacturing step is particularly useful for big volume series production of such rotors. An expedient manufacturing process includes the steps of (i) punching the rotor lamination so that the magnetic body and the rotor segment are at the beginning attached by small iron bridges; (ii) placing the embedded permanent magnets and retainer elements in respective slots of the magnetic body, (iii) removing the iron bridges, e.g. by grinding.

According to another favourable embodiment, the magnetic body can be made of iron powder. Openings for the embedded permanent magnet can be provided in the sinter form. The magnetic body can be manufactured by sintering the iron powder. It is expedient if at least one retainer element can be made from powder and co-sintered with the magnetic body. In such a case, the magnetic body and the retainer element can be manufactured in one step. As a result, manufacturing tolerances between openings for the retainer element and the retainer elements can be reduced. In an expedient embodiment, the rotor segment and the retainer elements associated with the rotor segment can be co-sintered and arranged in the rotor magnetic body, which can consist of or comprise stacked laminates or be sintered from iron powder material.

According to another favourable embodiment, the retainer element can be supported by one or more bandages retaining the rotor segment at its position at the magnetic body. This is advantageous in cases when not very high load is exerted to the rotor and in cases the retainer element is designed to be comparably small.

Another aspect of the invention relates to an electric machine with a stator and being excited by a rotor with magnetic poles formed by one or more embedded permanent magnets, according to any one of the features described above.

Favourably, the rotor of the electric machine can provide anyone of the advantages described above.

The electric machine may have the rotor being configured for a radial flux machine, an axial flux machine or a linear machine.

Additionally or alternatively the rotor for a radial flux machine may be configured as an external rotor surrounding the stator or the rotor may be configured as an internal rotor surrounded by the stator, or the rotor for an axial flux machine or for a linear machine may be configured as external rotors with a stator arranged between two external rotors or being configured as an internal rotor enclosed by two stators.

The retainer element can be easily arranged and shaped to its desired application in the electric machine. Such a design for an internal or external rotor refers to radial flux machines. The machine can also be designed as axial flux or linear machine. In case of multiple layers of embedded permanent magnets there can be two layers of embedded permanent magnets above and another in a layer below.

The electric machine is advantageous for various applications where low losses and high torque densities are required, expediently as a generator in a vehicle or as motor for driving a drive train in a vehicle.

BRIEF DESCRIPTION OF THE DRAWINGS

The present invention together with the above-mentioned and other objects and advantages may best be understood from the following detailed description of the embodiments, but not restricted to the embodiments, wherein is shown schematically:

FIG. 14a-14c a second embodiment of a rotor for an axial flux machine as front view (FIG. 14a), as cut view along line 14b-14b in FIG. 14a (FIG. 14b) and as side view of the rotor shown in FIG. 14a (FIG. 14c).

DETAILED DESCRIPTION

Figure 1:
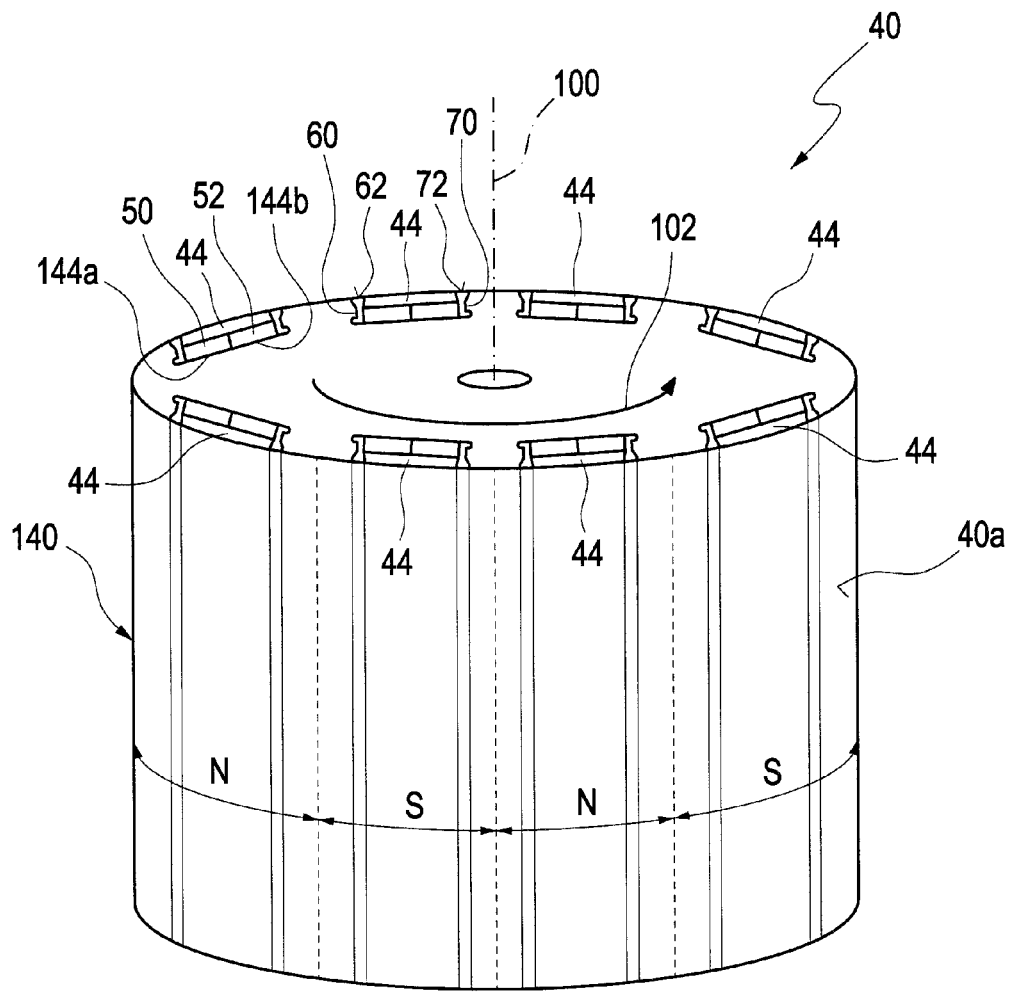
FIG. 1 a perspective view of an example embodiment of a rotor of a radial flux machine according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention. In order to avoid unnecessary repetitions, the description of the figures mainly focuses on differences between the individual embodiments so that not necessarily all elements in a figure are discussed, in particular if they had been discussed already in previous figures.

FIG. 1 depicts schematically a general overview of an embodiment of a rotor 40 of an internal-rotor electric machine (not shown) including embedded permanent magnets 50, 52 in a perspective view. The electric machine is designed as a radial flux machine excited by the embedded permanent magnets 50, 52, wherein the magnetic flux of the rotor 40 extends into the stator (not shown) in a radial direction with respect to a rotational axis 100 of the rotor 40.

The embedded permanent magnets 50, 52 are depicted as rectangular elements but can also have other shapes.

The rotor 40 is arranged around the rotational axis 100 and the embedded permanent magnets are arranged as set of pairs of embedded permanent magnets 50, 52 (more or less pairs of embedded permanent magnets can be used) defining a first magnetic pole N and a second magnetic pole S alternately in a circumferential direction 02 of the rotor 40. The rotor 40 comprises a substantially cylindrical magnetic body 140, wherein an embedded permanent magnet 50, 52 is being fitted at least on the edge of each magnetic pole N, S, as generally known in the art, which is indicated in the drawing by magnetic pole sectors on a shell surface 40a of the rotor 40 (see the dotted lines separating regions corresponding to magnetic N poles and magnetic S poles in the Figure).

This magnet configuration results in the rotor 40 being exited in opposite directions. The shell surface 40a is also called first surface 40a of the rotor 40. The embedded permanent magnets 50, 52 are distributed equidistantly along the circumferential direction 102 of the rotor 40 and may be inserted in axial slots 144a and 144b parallel to the rotational axis 100. According to an embodiment not displayed, the magnet poles N, S (i.e. the set of pairs of embedded permanent magnets 50, 52) can also be distributed with varying distances relative to each other instead of equidistantly. The rotor 40 may be mounted on a shaft (not shown) arranged along the rotational axis 100.

In this embodiment, by way of example, retainer elements 60, 70 are arranged at the sides of the embedded permanent magnets 50, 52, the retainer elements 60, 70 having outer edges 62, 72 which are flush with the shell surface 40a (also called first surface 40a) of the rotor 40.

Rotor segments 44 are arranged in front of each of the embedded permanent magnets 50, 52. The rotor segments 44 are flush with the shell surface 40a and are locked by the retainer elements 60, 70 in their radial position in the rotor 40.

The magnetization of the embedded permanent magnets 50, 52 is typically in a generally radial direction, so that the alternating magnetic poles N, S are generated at the shell surface 40a of the rotor 40. Particularly, the magnetization is crosswise, e.g. perpendicular, to the longitudinal main extension of the embedded permanent magnets 50, 52.

It is possible that there is only one embedded permanent magnet instead of a pair of embedded permanent magnets, depending on the geometry. With a V-shape arrangement, expediently at least one pair of embedded permanent magnets is provided. With a linear arrangement, it can be one or more embedded permanent magnets, e.g. a pair of embedded permanent magnets. A magnetic pole of the rotor 40 is to be understood as being a region covered by each embedded permanent magnet 50, 52. The embedded permanent magnet or magnets cover usually ⅔ of the magnetic pole. In particular, if the rotor 40 of the electric machine has eight magnetic poles (as shown in FIG. 1) the rotor 40 can be partitioned in eight sections of the same size. Each section represents a magnetic pole (S or N) alternately.

The embedded permanent magnets 50, 52 are arranged pair wise parallel in the circumferential direction 102 of the rotor 40. The arrangement of the embedded permanent magnets 50, 52 can, however, be arranged differently in other embodiments. For instance, the embedded permanent magnets 50, 52 can be oriented crosswise relative to the circumferential direction 102 (FIG. 1) and form a V-shaped arrangement (seen from above). The embedded permanent magnet 50 may abut embedded permanent magnet 52, as indicated in the Figure, or be separated by an iron bridge or a magnetically non-conductive material (also called "magnetically insulating").

Figure 2:
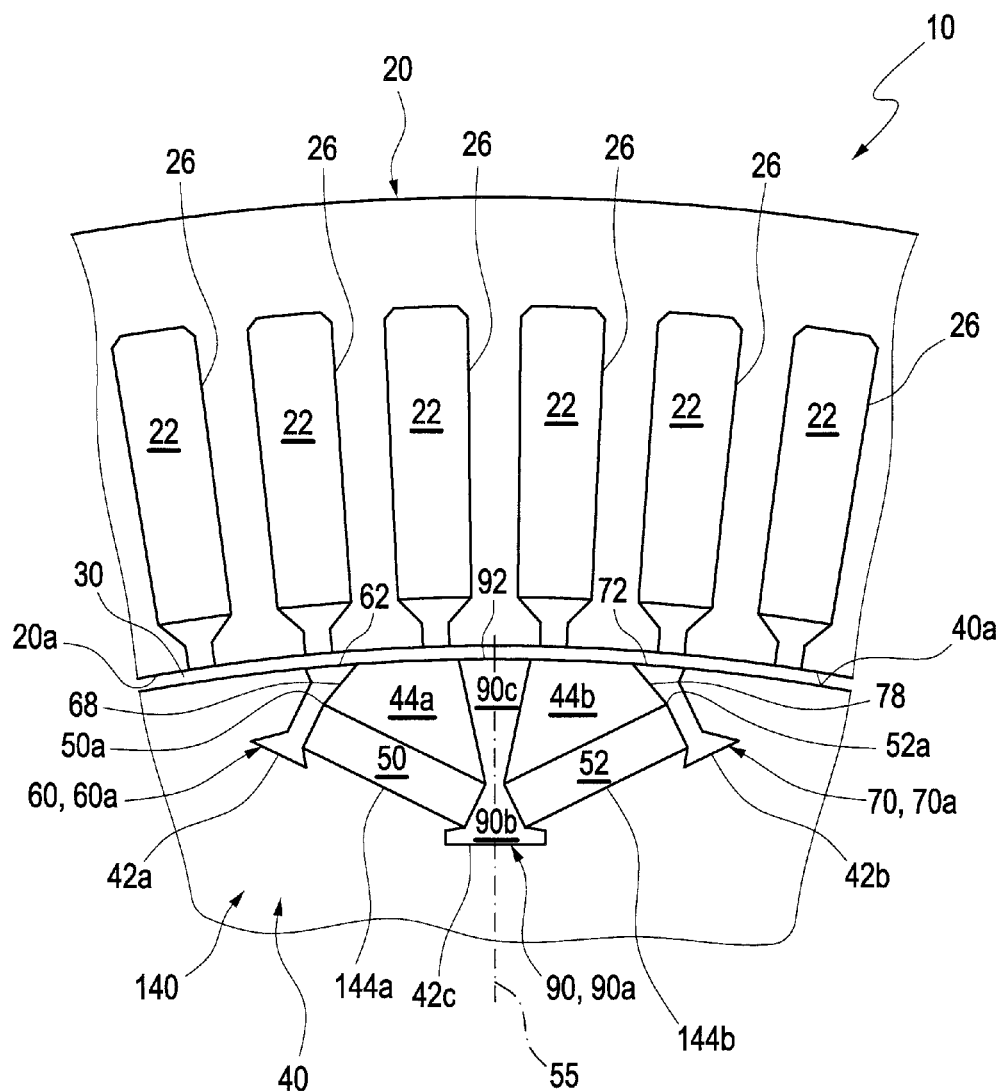
FIG. 2a-2c a detail of a cross sectional view of an example embodiment of an electric machine with embedded permanent magnets in a V-shape arrangement according to the invention (FIG. 2a) and variants of said arrangement (FIG. 2b, 2c)
Figure 2:
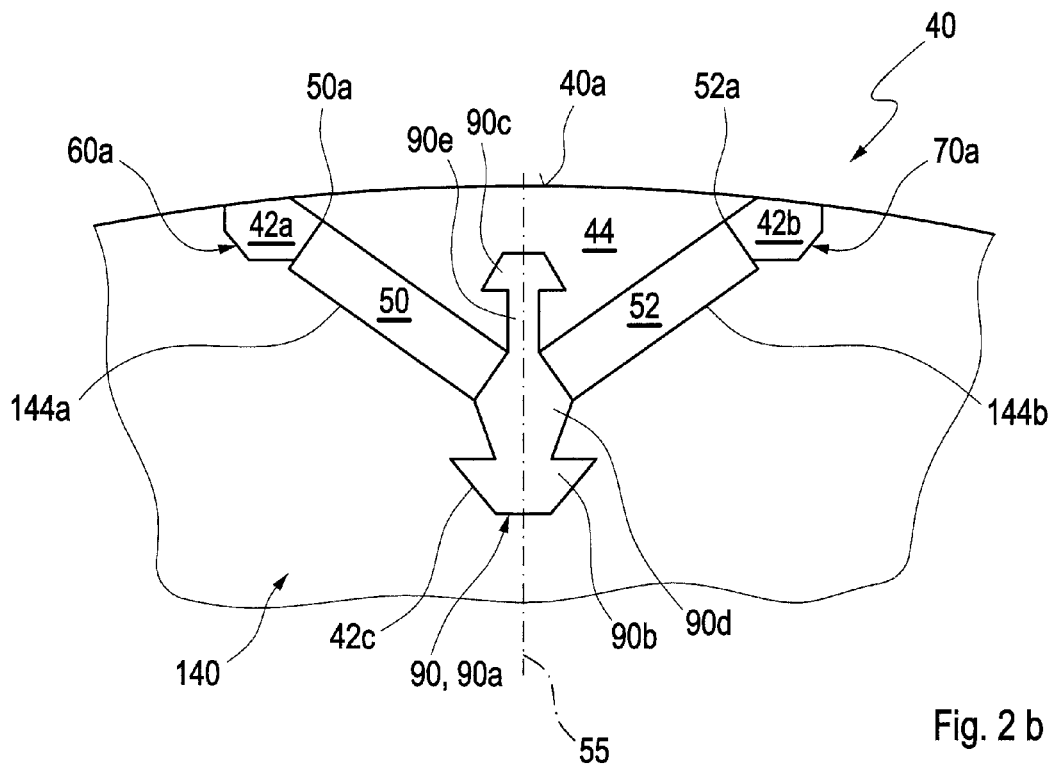
Figure 2:
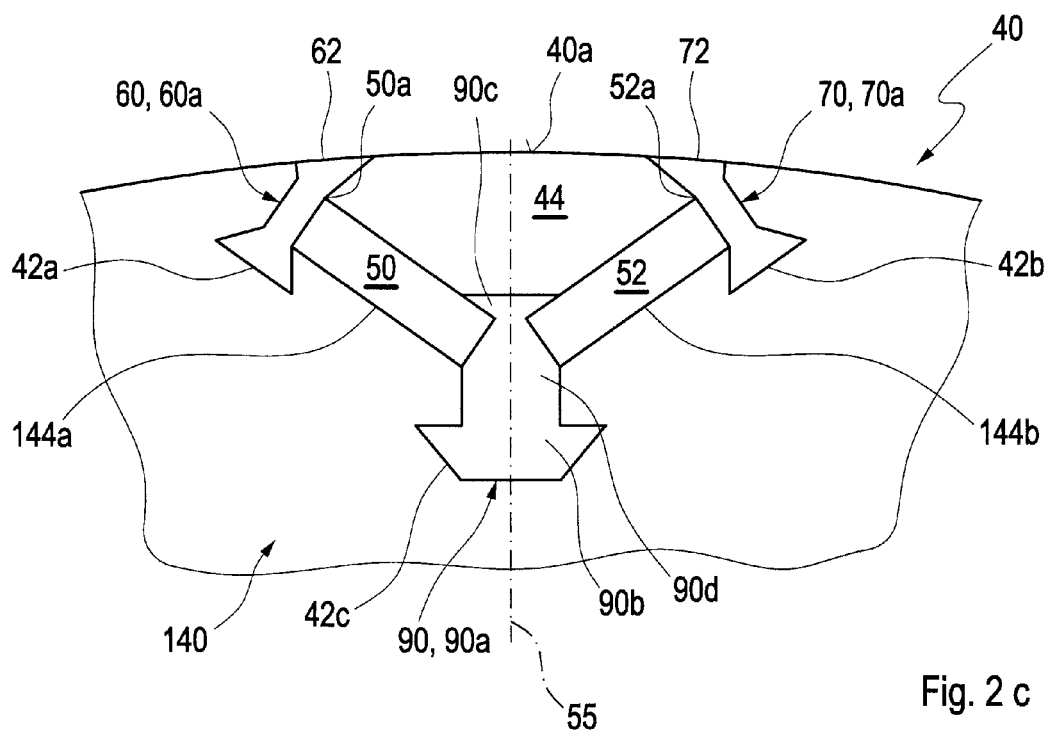

The rotor 40 is shown by way of example as an internal rotor which is surrounded by a stator 20 as shown in FIG. 2. However, the rotor 40 can also be designed as ring-shaped external rotor surrounding a stator (not shown). The magnetic poles N, S are provided for interacting with electrical windings of a stator facing the shell surface 40a of the stator 40.

FIG. 2a depicts in a cross sectional top view a detail of art electric machine 10 comprising, a rotor 40 surrounded by a ring-shaped stator 20. The stator 20 comprises electrical windings in form of coils 22 fitted in axial slots 26 in the stator 20. The equally spaced openings of the slots 26 in the stator 20 are separated by stator teeth and open towards an air gap 30.

The stator 20 is surrounding a rotor 40, wherein the air gap 30 is arranged between the stator 20 and the rotor 40. With its inner surface 20a the stator 20 is facing a shell surface 40a of the rotor 40 comprising in its cylindrical magnetic body 140 embedded permanent magnets 50, 52 in a V-shaped arrangement (seen from above).

Such V-shaped structures with pairs of embedded permanent magnets 50, 52 are equidistantly arranged in axial slots 144a (for embedded permanent magnet 50) and 144b (for embedded permanent magnet 52) in the circumferential direction of the rotor 40. Only one such structure with a pair of embedded permanent magnets 50, 52 is shown in the Figure. The embedded permanent magnets 50, 52 may be magnetized crosswise to a main longitudinal extension of the embedded permanent magnets 50, 52, for instance perpendicular to the main longitudinal orientation or tilted with respect to the perpendicular orientation, with an angle of magnetization. The embedded permanent magnets 50, 52 have a rectangular shape with two opposing narrow sides and two opposing broad sides. The first embedded permanent magnet 50 is arranged in slot 144a, and the second embedded permanent magnet 52 is arranged in slot 144b. Between the embedded permanent magnets 50, 52 and the air gap 30 rotor segments 44a, 44b are arranged which are magnetically associated with the magnetic body 140 of the rotor 40.

The magnetic body 140 of the rotor 40 includes axial slots 42a, 42b, 42c in which retainer elements 60, 70, 90 are arranged which are assigned to the embedded permanent magnets 50, 52. The retainer elements 60, 70, 90 may by made of a magnetically non-conductive material forming magnetically non-conductive areas 60a, 70a, 90a. The element 90a may also have a high mechanical strength in the case of inner rotor machines.

In the embodiment shown, the embedded permanent magnets 50, 52 are separated by the retainer element 90, with a portion 90b at a radial inner position distant from the air gap 30 and a portion 90c extending radially towards the air gap 30. The embedded permanent magnets 50, 52 are oriented crosswise relative to the circumferential direction 102 (FIG. 1) and form a V-shaped arrangement (seen from above) but may also be positioned parallel to the shell surface 40a.

Considering the geometric arrangement, the embedded permanent magnets 50, 52 are arranged at both sides of a local (radially oriented) symmetry axis 55 in the middle of the retainer element 90.

At an outer end of the embedded permanent magnet 50 opposite to the retainer element 90 the retainer element 60 is arranged, forming the magnetically non-conductive area 60a in case the retainer element 60 is made of a magnetically non-conductive material with high mechanical strength. Likewise, at an outer end of the embedded permanent magnet 52 opposite to the retainer element 90 the retainer element 70 is arranged, forming the magnetically non-conductive area 70a in case the retainer element 70 is made of a magnetically non-conductive material.

The retainer elements 60, 70 are arranged at the sides of the embedded permanent magnets 50, 52. All retainer elements 60, 70 and 90 extend from the inner region of the rotor 40 to the shell surface 40a. The retainer elements 60, 70, 90 extend from an inner radial position of the embedded permanent magnets 50, 52 distant from the shell surface 40a to the air gap 30 and are flush with the shell surface 40a with interfaces to the air gap 30 formed by their outer edges 62, 72, 92. At a radial inner end of the retainer elements 60, 70, 90 distant from the shell surface 40a the retainer elements 60, 70, 90 undercut the magnetic body 140 seen in top view, thus locking the retainer elements 60, 70, 90 in the magnetic body 140 of the rotor 40 in the radial direction.

The rotor segments 44a, 44b abutting the air gap 30 are arranged between the embedded permanent magnets 50, 52 and the shell surface 40a and are confined sideways by the retainer elements 60 and 90, and 90 and 70, respectively. As the retainer elements 60, 70, 90 are flush with the shell surface 40a of the rotor 40, the rotor segments 44a and 44b are geometrically separated from the main portion of the magnetic body 140 by the embedded permanent magnets 50 and 52, respectively, and the retainer elements 60, 90 and 90, 70, respectively. However, the rotor segments 44a and 44b still form magnetically a part of the magnetic body 140.

In the embodiment shown in FIG. 2a, the retainer elements 60, 70 abut edges 50a, 52a of the embedded permanent magnets 50, 52 in a generally radial direction with an offset in the circumferential extension of the retainer elements 60, 70, whereas the middle retainer element 90 arranged between the embedded permanent magnets 50, 52 abuts edges of the embedded permanent magnets 50, 52 opposite to the edges 50a, 52a. Above the embedded permanent magnets 50, 52 the retainer elements 60, 70 are inclined towards the local symmetry axis 55 so that each retainer element 60, 70 overlaps the edges 50a, 52a of the embedded permanent magnets 50, 52. On one side of the rotor segment 44a, the retainer element 60 has a portion 68 engaging the rotor segment 44a and at the opposite side with respect to the circumferential extension of the rotor segment 44b the retainer element 70 has a portion 78 engaging the rotor segment 44b from the opposite side. The portions 68, 78 establish the offset of the radial extension of the retainer element 60, 70 towards the local symmetry axis 55. The portions 68, 78 of the retainer elements 60, 70 establish a stable fixation of the position of the rotor segments 44a, 44b with respect of a radial direction of the rotor 40. The retainer element 90 is narrower close to the embedded permanent magnets 50, 52 and broader close to the air gap 30 which also form locks for the rotor segments 44a, 44b. The arrangement is a form locking arrangement of the rotor segments 44a, 44b, the retainer elements 60, 70, 90 and the embedded permanent magnets 50, 52.

FIG. 2b shows an alternative embodiment of the arrangement of the wedge-like retainer element 90. Only one retainer element 90 is provided associated with the embedded permanent magnets 50, 52, where retainer element 90 is arranged between the embedded permanent magnets 50, 52. A single rotor segment 44 is arranged between the embedded permanent magnets 50, 52, the embedded permanent magnets 50, 52 being substantially arranged in a V-shape arrangement seen from above. The retainer element 90 has at its radial inner end 90b distant from the shell surface 40a and its radial outer end 90c close to the shell surface 40a structures in form of a double wedge which locks the retainer element 90 and the rotor segment 44 in the magnetic body 140. Air filled slots 42a and 42*b* forming air pockets are shaped in the magnetic body 140. The magnetic body 140 supports retaining the embedded permanent magnets 50, 52 in place by the slots 144*a*, 144*b* for the embedded permanent magnets 50, 52 that form an undercut region with respect to the slots 42*a*, 42*b*. The embedded permanent magnets 50, 52 abut a middle portion 90*d* of the retainer element 90 with their narrow sides. The middle portion 90*d* protrudes with a short neck 90*e* to the radial outer end 90*c* of the retainer element 90 close to the surface shell 40*a*, that the radial outer broad sides of the embedded permanent magnets 50, 52 abut the rotor segment 44 of the magnetic body 140.

The opposite outer ends of the embedded permanent magnets 50, 52 abut the air filled slots 42*a*, 42*b*. In this embodiment, the retainer element 90 is completely inside the magnetic body 40 and has no interface with the air gap 30 (FIG. 2*a*). The retainer element 90 and the air filled slots 42*a*, 42*b* form magnetically non-conductive regions in the magnetic body 140 of the rotor 40. The retainer element 90 may also have high mechanic strength.

FIG. 2*c* shows an alternative embodiment to FIG. 2*b* wherein the retainer element 90 arranged between the embedded permanent magnets 50, 52 has again double-wedges at its radial inner end 90*b* distant from the shell surface 40*a* and its radial outer end 90*c* closer to the shell surface 40*a*. A middle portion 90*d* connects the radial inner end 90*b* and the radial outer end 90*c* of the retainer element 90. The retainer element 90 is shorter than that retainer element 90 shown in FIG. 2*b* and is formed such that the inner opposing narrow sides of the embedded permanent magnets 50, 52 abut the retainer element 90 as well as inner portions of the outer broad sides of the embedded permanent magnets 50, 52. At each of the outer narrow sides of the embedded permanent magnets 50, 52 a retainer element 60, 70 is arranged like in FIG. 2*a* which have an interface with the air gap 30 formed by their edges 62, 72 and are flush with the shell surface 40*a* of the rotor 40.

Figure 3:
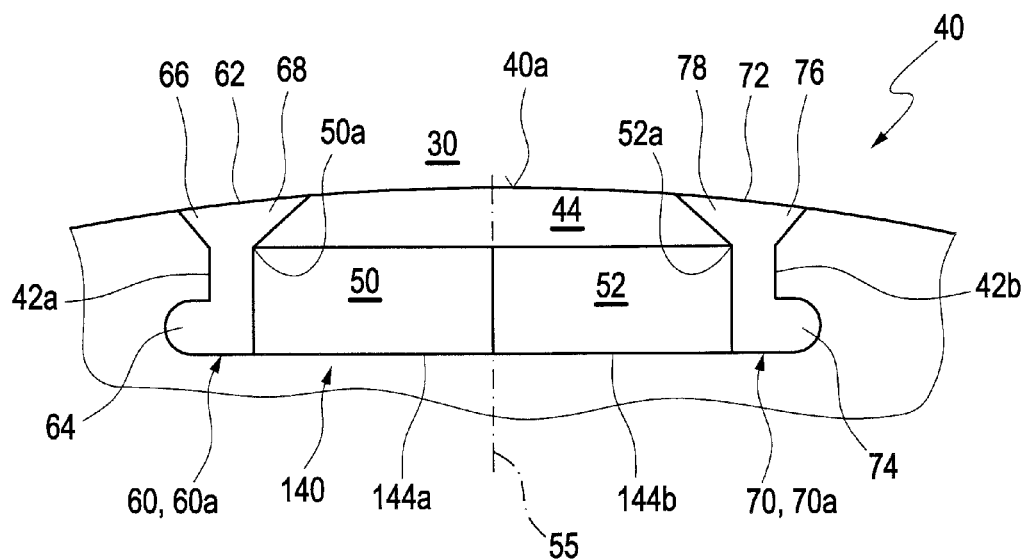
FIG. 3 a detail of a cross sectional view of another example embodiment of a rotor according to the invention encompassing retainer elements.

FIG. 3 illustrates another embodiment of a rotor 40 with an alternative shape of the retainer elements 60, 70. In this embodiment, there is no retainer element provided between the two embedded permanent magnets 50, 52 arranged in axial slots 144*a*, 144*b* in the rotor's magnetic body 140. The retainer elements 60, 70 are arranged in axial slots 42*a*, 42*b*.

As can be seen in the Figure, an edge 62, 72 forming an air-gap interface of each retainer element 60, 70 is flush with the shell surface 40*a* of the rotor 40 and thus abuts the air gap 30. A rotor segment 44 is arranged between embedded permanent magnets 50, 52 and the shell surface 40*a* of the rotor 40. The arrangement of embedded permanent magnets 50, 52 and retainer elements 60, 70 is symmetrical to a local symmetry axis 55.

The retainer elements 60, 70 extend from the radial inner ends of the embedded permanent magnets 50, 52 distant from the shell surface 40*a* the shell surface 40*a* and the air gap 30. Along their radial extensions, the retainer elements 60, 70 have a concave shape towards the magnetic body 140 so that at their radial lower ends distant from the shell surface 40*a* a portion 64, 74 of the respective retainer element 60, 70 protrudes into the magnetic body 140 pointing away from the embedded permanent magnets 50, 52 as well as the upper end of the respective retainer element 60, 70 closer to the shell surface 40*a* portions 66, 76 protrude into the magnetic body 140 in the same direction.

At the upper end of the respective retainer element 60, 70 closer to the shell surface 40*a* of the rotor 40 portions 68, 78 protrude into the rotor segment 44 starting from the outer edges 50*a* and 52*a* of the embedded permanent magnets 50, 52 forming a form locking of the rotor segment 44 in the radial direction.

Figure 4:
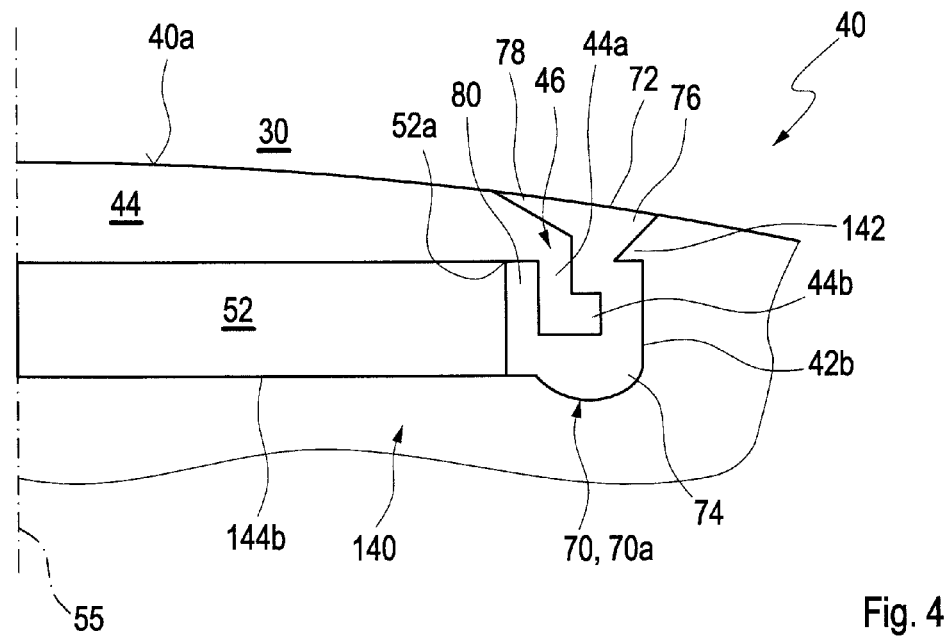
FIG. 4 a detail of a cross sectional view of another example embodiment of a rotor according to the invention encompassing a generally U-shaped retainer element.

Another variant of a retainer element 70 is displayed in FIG. 4, which shows only one embedded permanent magnet 52 (fitted in an axial slot 144*b*) of the arrangement of embedded permanent magnets 50, 52 and retainer elements 60, 70 being arranged mirror symmetrical to a local symmetry axis 55.

The retainer element 70, forming a magnetically non-conductive area 70*a*, is arranged in an axial slot 42*b* and is flush with the shell surface 40*a* abutting an air gap 30.

The retainer element 70 is substantially U-shaped and has at its lower end, which starts level with the lower end of the embedded permanent magnet 52 distant from the shell surface 40*a*, a portion protruding radial downwards into the magnetic body 140 of the rotor 40 away from the shell surface 40*a*. The rotor segment 44 arranged between the embedded permanent magnet 52 and the shell surface 40*a* extends with a portion 46 into the U-shape of the retainer element 70 having a first leg 44*a* in a generally radial direction and a second leg 44*b* in circumferential direction. The leg 44*a* of the rotor segment 44 and the embedded permanent magnet 52 enclose a portion 80 of the retainer element 70. The rotor segment 44 is form locked in the retainer element 70 via the portion 46.

At the upper end of the retainer element 70 close to the shell surface 40*a* a portion 78 of the retainer element 70 protrudes into the rotor segment 44 forming a form locking in the radial direction, whereas an opposing portion 76 of the retainer element 70 protrudes into the magnetic body 140 away from the rotor segment 44. A portion 142 of the magnetic body 140 engages a recess in the retainer element 70 providing a form locking for the retainer element 70 in the magnetic body 140. The retainer element 70 forms a magnetically non-conductive area 70*a* in the magnetic body 140 in case the retainer element 70 is made of a magnetically non-conductive material.

Figure 5:
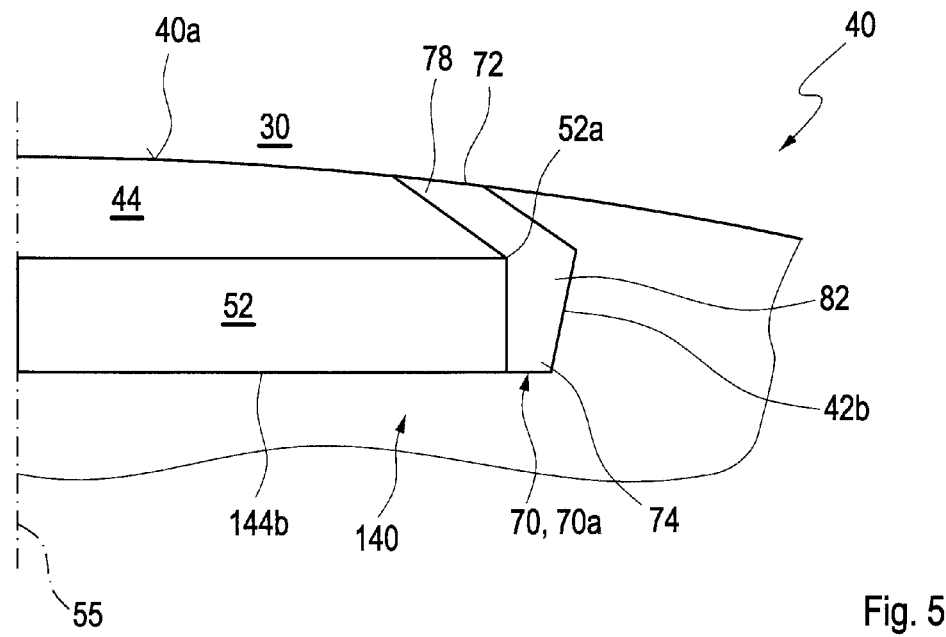
FIG. 5 a detail of a cross sectional view of another example embodiment of a rotor according to the invention encompassing a retainer element bent towards a rotor segment.

FIG. 5 illustrates another embodiment of a retainer element 70 arranged in an axial slot 42*b* in a magnetic body 140 of a rotor 40. Displayed is only one half of an arrangement mirror symmetric to a local symmetry axis 55 (similar to the arrangement in FIG. 4).

At the lower radial end distant from the shell surface 40*a* abutting an air gap 30, the retainer element 70 is level with the lower end of the embedded permanent magnet 52 distant from the shell surface 40*a* and abuts the embedded permanent magnet 52 arranged in an axial slot 144*b*. An outer edge of the retainer element 70 is inclined away from the embedded permanent magnet 52 up to a bend 82 at the radial position of the upper end of the embedded permanent magnet 52 from where it is inclined towards the local symmetry axis 55 to overlap the rotor segment 44 and the embedded permanent magnet 52 in the circumferential direction.

The retainer element 70 has an edge 72 flush with the shell surface 40*a* abutting the air gap 30 and is inclined close to the shell surface 40*a* with a portion 78 towards the rotor segment 44. The retainer element 70 thereby is locking by form fitting the rotor segment 44 and the embedded permanent magnet 52 at the magnetic body 140.

Figure 6:
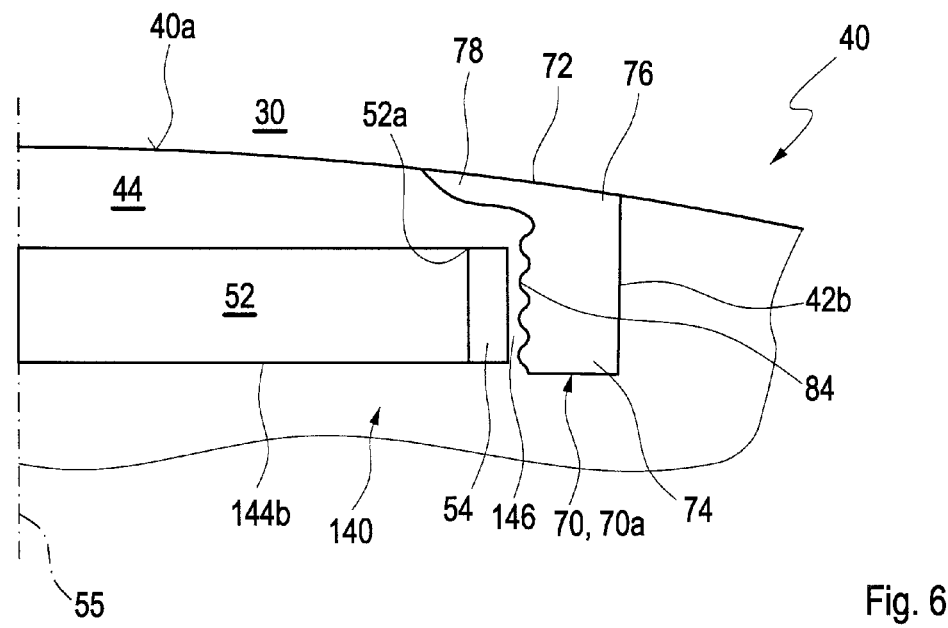
FIG. 6 a detail of a cross sectional view of another example embodiment of a rotor according to the invention encompassing a retainer element with a toothed connection with a magnetic body of a rotor.

FIG. 6 shows an example embodiment where the rotor segment 44 of the rotor 40 is integral with the main portion of the magnetic body 140 of the rotor 40.

Displayed is only one half of an arrangement mirror symmetric to a local symmetry axis 55 (similar to the arrangement in FIGS. 4 and 5).

The rotor segment 44 is connected with the magnetic body's main portion via a bridge 146. Between the bridge 146 and the narrow side of the embedded permanent magnet 52 an air pocket 54 is arranged. The embedded permanent magnet 52 is arranged in an axial slot 144b in the magnetic body 140.

The retainer element 70, forming a magnetically non-conductive area 70a in case the retainer element 70 is magnetically non-conductive, abuts the bridge 146, wherein a region 84 is provided at the interface between the bridge 146 and the retainer element 70. In the region 84 the retainer element 70 is toothed with the bridge 146.

The retainer element 70 extends from a radial inner position distant from the shell surface 40a of the rotor 40 to the shell surface 40a which is abutting an air gap 30. The retainer element 70 has an edge 72 which is flush with the shell surface 40a. At the upper end close to the shell surface 40a a portion 78 of the retainer element 70 points towards the local symmetry axis 55 thus stabilizing the rotor segment 44 in its radial position.

Figure 7:
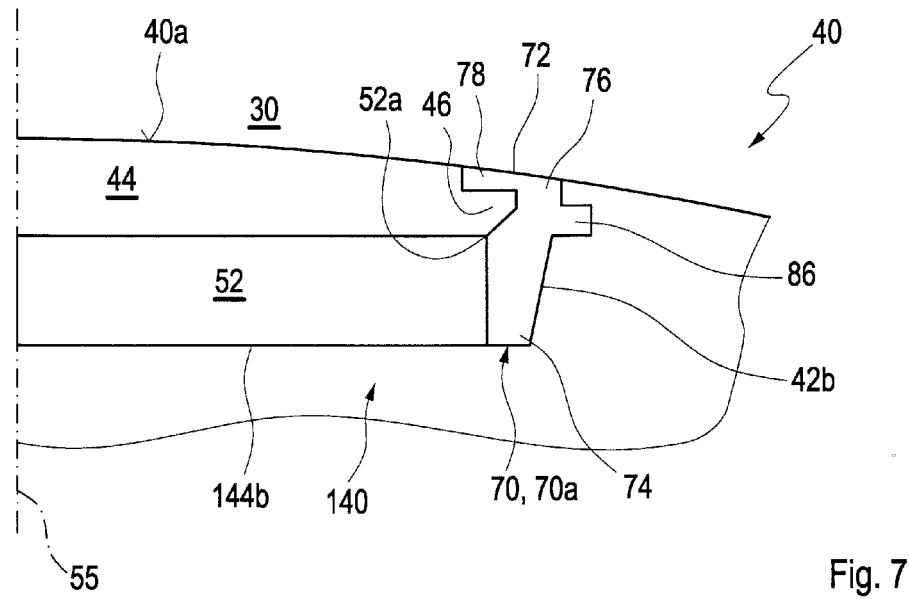
FIG. 7 a detail of a cross sectional view of another example embodiment of a rotor according to the invention encompassing a retainer element.

FIG. 7 illustrates another example embodiment which is similar to the embodiment in FIG. 6. Displayed is only one half of an arrangement mirror symmetric to a local symmetry axis 55 (similar to the arrangement in FIGS. 4, 5 and 6).

In this embodiment the retainer element 70, forming a magnetically non-conductive area 70a in case the retainer element is magnetically non-conductive, abuts the embedded permanent magnet 52 without air pocket 54 and bridge 146 (compared to the embodiment shown in FIG. 6). The retainer element 70 is flush with the shell surface 40a and abuts an air gap 30 with its edge 72. The embedded permanent magnet 52 is arranged in an axial slot 144b in the magnetic body 140 of the rotor 40.

The rotor segment 44 of the rotor 40 has a portion 46 protruding into a recess below a portion 78 at the upper end of the retainer element 70 close to the shell surface 40a of the rotor 40. The portion 78 is pointing towards the local symmetry axis 55 so that portion 46 locks (in a form fit manner) the rotor segment 44 in the retainer element 70 in the radial direction and partially overlaps the embedded permanent magnet 52 in the circumferential direction.

The retainer element 70 abuts the embedded permanent magnet 52 and is inclined away from the embedded permanent magnet 52 at its edge opposite to the narrow side of the embedded permanent magnet 52. At a radial position level with the upper end of the permanent magnet 52 closer to the shell surface 40a the retainer element 70 has a portion 86 protruding into a recess in the magnetic body 140 of the rotor 40 thus fixing the retainer element 70 in the magnetic body 40. The lower end with portion 74 of the retainer element 70 distant from the shell surface 40a is level with the lower end of the embedded permanent magnet 52.

Figure 8:
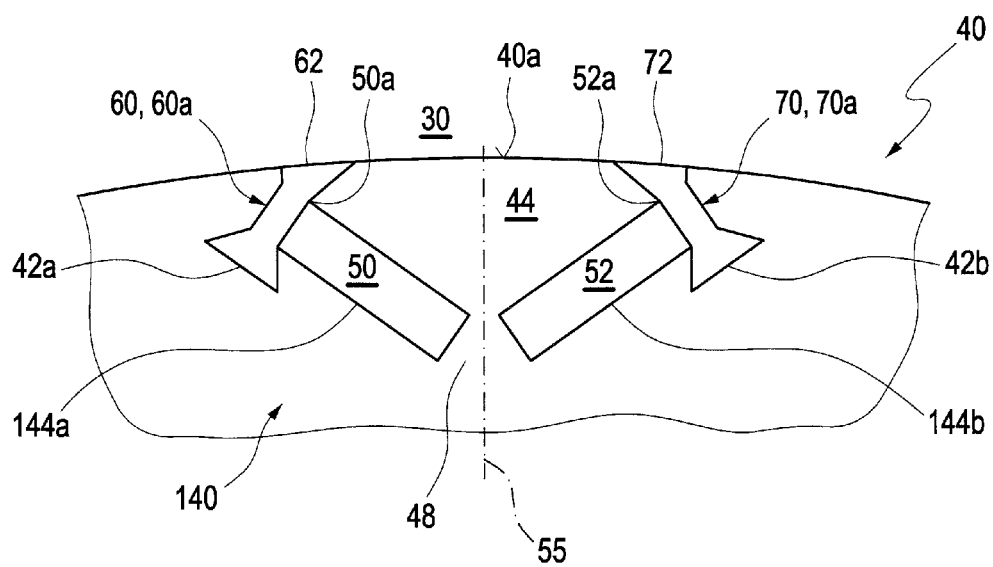
FIG. 8 a detail of a cross sectional view of an example embodiment of a rotor according to the invention encompassing retainer elements.

In contradistinction to the embodiments shown in FIGS. 3 to 7 where the embedded permanent magnets 50, 52 are arranged in a straight arrangement generally parallel to the shell surface 40a, FIG. 8 shows a V-shaped arrangement (seen from above) of the embedded permanent magnets 50, 52. More particularly, FIG. 8 shows a detail of a cross sectional view of an example embodiment of a rotor 40 according to the invention with two embedded permanent magnets 50, 52 arranged substantially in a V-shape symmetrically arranged with respect to a local symmetry axis 55, similar to the arrangement shown in FIGS. 2a-c. In the embodiment depicted in FIG. 8, however, compared to the embodiments according to FIGS. 2a-2c, the embedded permanent magnets 50, 52 are separated by an iron bridge 48 instead of a magnetically non-conductive retainer element (as shown in FIGS. 2a-c). The retainer elements 60, 70 are inserted in axial slots 42a and 42b, respectively. The retainer elements 60, 70 constitute magnetically non-conductive areas 60a, 70a in case the retainer elements 60, 70 are magnetically non-conductive, and are flush with the shell surface 40a of the rotor 40 at the air gap 30 with their edges 62, 72. Undercuts on both sides of the retainer elements 60, 70 at a radial distance from the shell surface 40a lock the retainer elements 60, 70 in a form fit manner in the magnetic body 140 of the rotor 40. The retainer elements 60, 70 have a main longitudinal extension which is inclined with respect to the local symmetry axis 55 so that the rotor segment 44 is locked on both sides by the retainer elements 60, 70 in its radial position additionally to the connection to the main portion of the magnetic body 140 via the bridge 48.

Figure 9:
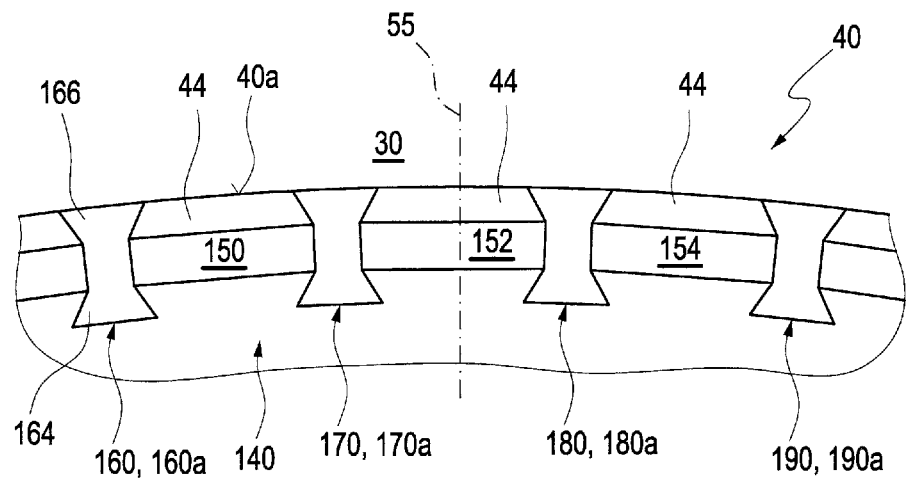
FIG. 9 a detail of a cross sectional view of another example embodiment of a rotor according to the invention showing several embedded permanent magnets and retainer elements.

FIG. 9 depicts a detail of a cross sectional view of an example embodiment of a rotor 40 according to the invention with several embedded permanent magnets 150, 152, 154. The embedded permanent magnets 150, 152, 154 are alternating with magnetically non-conductive areas 160a, 170a, 180a, 190a formed by respective retainer elements 160, 170, 180, 190 which each have a surface flush with the shell surface 40a of the rotor 40 at the air gap 30. The arrangement continues on both sides of the detailed view all around the circumference of the rotor 40. Between the embedded permanent magnets 150, 152, 154 and the shell surface 40a rotor segments 44 are arranged, one rotor segment 44 assigned to each embedded permanent magnet 150, 152, 154 which are confined sidewise by the retainer elements 160, 170, 180, 190.

As exemplified in more detail for retainer element 160, the retainer elements 160, 170, 180, 190 have undercuts with portions protruding on both sides (seen from above) into the magnetic body 140 at a lower side 164 at a radial distance from the shell surface 40a thus form locking the retainer elements 160, 170, 180, 190 in the magnetic body 140 of the rotor 40. An upper portion 166 close to the shell surface 40a protrudes on both sides (seen from above) into the rotor segments 44 thus locking the rotor segments 44 safely in radial direction.

Figure 10:
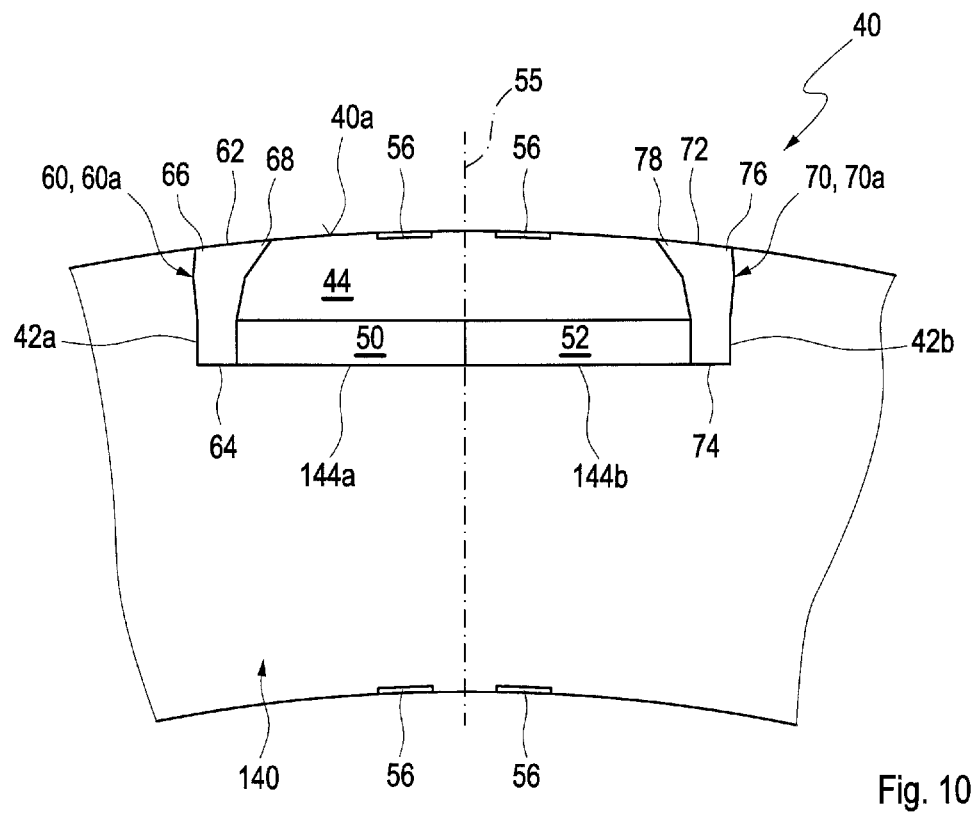
FIG. 10 a detail of a cross sectional view of another embodiment of a rotor according to the invention encompassing a retainer element and bandages for retaining a rotor segment.

FIG. 10 displays another example embodiment of a rotor 40 according to the invention wherein a rotor segment 44 arranged in a radial direction between embedded permanent magnets 50, 52 and the shell surface 40a is fixed by retainer elements 60, 70 as well as by bandages 56 axially wound around the outer shell surface 40a and the inner shell surface of the rotor 40. Holding means such as straps, bandages and the like can be used in case the retaining force of the retainer elements 60, 70 has to be supported.

In the various embodiments described above, the retainer elements 60, 70, 90; 150, 160, 170, 180, 190 may favourably be magnetically non-conductive and may comprise or may be composed of e.g. carbon fibre, carbon fibre composites, glass fibre, glass fibre composites, polymer fibre, such as e.g. aramid fibre, polymer fibre composite, ceramics, plastics. The retainer elements 60, 70, 90; 150, 160, 170, 180, 190 can be separate devices which are inserted in corresponding axial slots 42a, 42b in the magnetic body 140 of the rotor 40, but may alternatively be made of powder material and co-sintered with the magnetic body 140 in case the magnetic body 140 is manufactured from iron powder material. Generally, the magnetic body 140 may be made of stacked laminates or sintered from iron powder material, as known in the art.

In the embodiments described above, where the retainer elements 60, 70, 90, 160, 170, 180, 190 extend from an inner or lower radial position distant from the shell surface 40a of the rotor 40 to the shell surface 40a and are flush with the shell surface 40a, magnetic losses due to quenched magnetic flux in the magnetic body 140 can be minimised by replacing magnetic conducting material of the magnetic body 140 by the magnetically non-conductive material of the elements 60, 70, 90, 160, 170, 180, 190. In these embodiments, examples of which are displayed in FIGS. 1, 2a, 2c, 3 to 10, the retainer elements 60, 70, 90, 160, 170, 180, 190 lock the rotor segments 44 in the radial position. In embodiments where the retainer elements 90 do not protrude to the shell surface 40a, like exemplified in FIG. 2b, it is possible to have axial slots 42a, 42b forming air pockets flush with the shell surface 40a for replacing magnetic material of the magnetic body 140 where else magnetic flux would be quenched.

Generally, the retainer elements can be designed as desired and can easily be adapted to comply with other requirements of the design of the electric machine.

Figure 11:
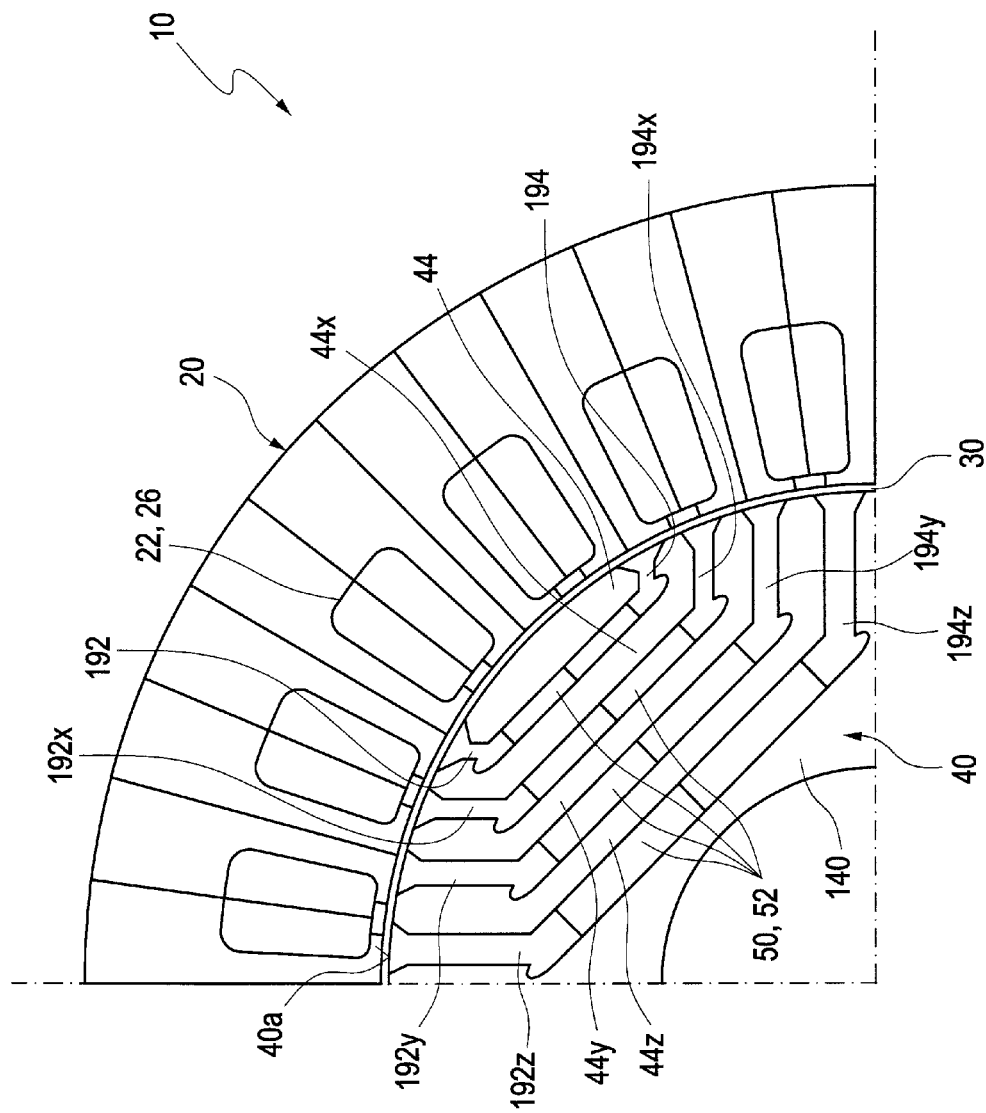
FIG. 11 in a cross sectional view of a section of a radial flux machine comprising radial multilayered embedded permanent magnets.

FIG. 11 depicts in a cross section view of one magnetic pole of a radial flux machine 10 which comprises a rotor 40 with radial multilayered embedded permanent magnets 50, 52 surrounded by a stator 20 with stator coils 22 arranged in vertical slots 26, wherein an air gap 30 is arranged between stator 20 and rotor 40. The rotor 40 has a generally annular cross section with an opening for a shaft in the centre (indicated by the solid curved line in the radially inner side of the rotor 40).

In the embodiment shown in the Figure, four pairs of longitudinal extended embedded permanent magnets 50, 52 are arranged parallel to each other in radial direction so that they are stacked in the radial direction, wherein each rotor segment 44x, 44y, 44z is sandwiched between two adjacent magnets of the embedded permanent magnets 50, 52. Between the outermost embedded permanent magnets 50, 52 and the air gap 30 a rotor segment 44 is arranged. Of course, the number of pairs of embedded permanent magnets can be larger or smaller than four pairs in this example embodiment.

From the shell surface 40a of the rotor 40 the longitudinal extension of the pairs of embedded permanent magnets 50, 52 protracts towards the centre of the rotor 40. At each side of the pairs of embedded permanent magnets 50, 52, retainer elements 192, 192x, 192y, 92z on one side and 194, 94x, 194y, 194z on the opposite side are arranged which lock the pairs of embedded permanent magnets 50, 52 in the magnetic body 140 of the rotor 40. The retainer elements 192, 192x, 92y, 192z, 194, 94x, 194y, 194z include or consist of magnetically non-conductive areas with high mechanical strength.

The retainer elements 192, 192x, 192y, 192z, 194, 194x, 194y, 194z are bent towards the air gap 30 so that they extend only inside the segment of the magnetic pole of the rotor 40. At their free ends the retainer elements 192, 192x, 192y, 192z, 194, 194x, 194y, 94z may be shaped in wedge-like manner as described in the aforementioned embodiments to provide a locking of the embedded permanent magnets 50, 52 and the rotor segments 44, 44x, 44y, 44z in the magnetic body 140. However, it may be possible that only one or only a part of the embedded permanent magnets 50, 52 are provided with retainer elements 192, 192x, 192y, 192z, 194, 194x, 194y, 194z.

Figure 12:
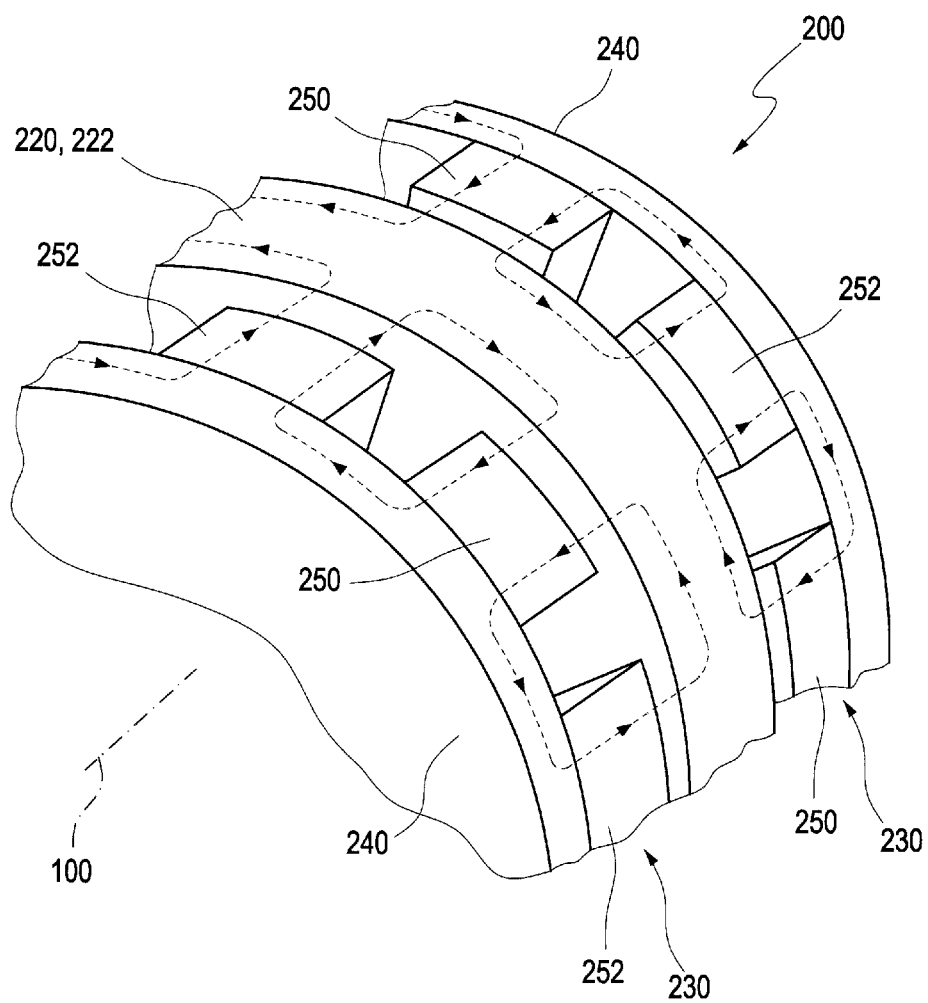
FIG. 12 a perspective partial view of an axial flux machine with two axially spaced rotors separated by a stator according to prior art.

FIG. 12 shows a perspective partial view of an axial flux machine 200 with surface mounted permanent magnets according to prior art. In an axial flux machine 200 the magnetic flux of a rotor 240 extends into a stator 220 in an axial direction 100 with respect to the rotational axis of the rotor 240. The stator 220 may be sandwiched between two rotors 240 or vice versa. Further it is possible that a multitude of stators 220 and rotors 240 are stacked along the rotational axis 100.

The axial flux machine 200 as depicted in the Figure has two axially spaced cylindrical disc-like rotors 240 with a cylindrical, disc-like stator 220 comprising stator coils 222 as known in the art, arranged between the rotors 240 with an axial distance to each stator 220. The coils can have different arrangements and are not explicitly shown in the Figure.

The permanent magnets 250, 252, which in this embodiment protrude axially from the rotors 40, are magnetized in axial direction and arranged at the axial inner sides of the rotors 240 facing the stator 220, wherein the permanent magnets 250, 252 of one rotor 240 are pointing towards the permanent magnets 250, 252 of the other rotor 240 (and vice versa). The permanent magnets 250, 252 of each rotor 240 have the same position related to the circumference of the rotors 240. Each permanent magnet can be split in smaller segments for example to reduce magnet losses.

The magnetic flux is indicated by broken lines in closed circles each such circle encompassing an area between two adjacent permanent magnets 250, 252 with one branch in the rotor 240 and one branch in stator 220.

Whereas iron laminates of the rotor 40 and/or stator 20 in a radial flux machine 10 as described in the previous embodiments, are stacked in axial direction, in an axial flux machine 200 made of iron lamination the laminates are stacked in radial direction, i.e. a sheet material is rolled up around the rotational axis 100, forming the rotor 240 or stator 220. In such an arrangement special techniques have to be used to form the slots in the laminated material before or after forming the rotor 240 or stator 220. Alternatively the rotor 240 and/or stator 220 however can also be formed by iron powder material, such as so called SMC (Soft Magnetic Composite) material.

Figure 13:
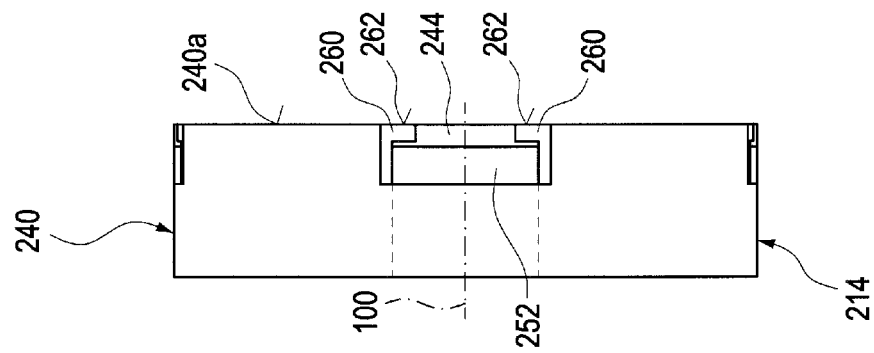
FIG. 13a-13c a first embodiment of a rotor for an axial flux machine as front view (FIG. 13a), as cut view along line 13b-13b in FIG. 13a (FIG. 13b) and as side view of the rotor shown in FIG. 13a (FIG. 13c)
Figure 13:
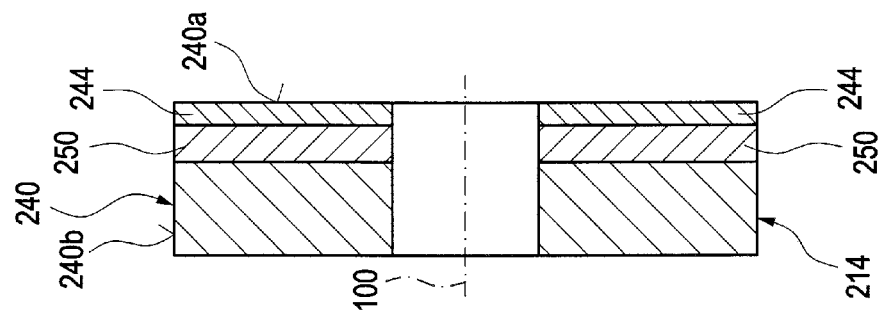
Figure 13:
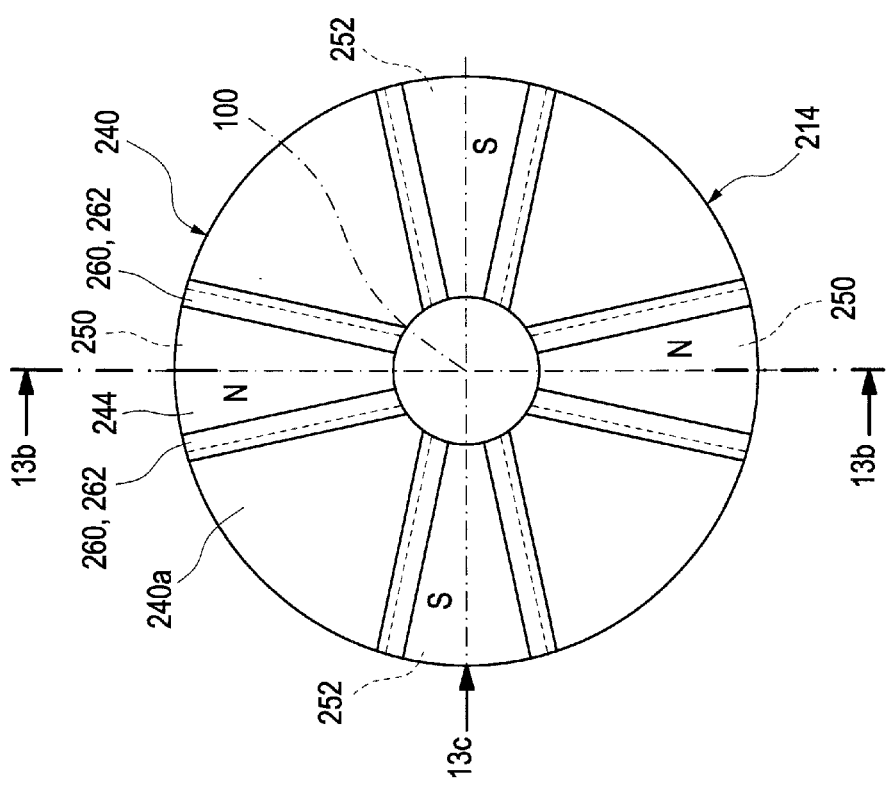

FIGS. 13a-13c illustrate a first embodiment of a rotor 240 for an axial flux machine 200 similar to the one shown in FIG. 12, as front view (FIG. 13a), as cut view along line 13b-13b (FIG. 13b) and as side view (FIG. 3c).

The embedded permanent magnets 250, 252 are arranged on the front face 240a of the disc-like rotor 240, the rotor 240 having a magnetic body 214, and they extend from an outer shell surface 240b of the rotor 240 towards an inner surface of an opening provided for a shaft in a way that the embedded permanent magnets 250, 252 are arranged in axial recesses with retainer elements 260 at each side of the embedded permanent magnets 250, 252. Seen from above, each of the embedded permanent magnets 250, 252 has a shape of a segment of a circle. Each embedded permanent magnet 250 has a neighbouring embedded permanent magnet 252 of opposite polarity. The shape of the embedded permanent magnets 250, 252 can have any shape, for instance the embedded permanent magnets 250, 252 can be cut as straight segments instead of segments of a circle, and the like.

On top (in the axial direction) of each embedded permanent magnet 250, 252, a rotor segment 244 is arranged which is locked via the retainer elements 260 in its axial position on top of the embedded permanent magnet 250, 252. The segment 244 can be made of SMC material. The outer surfaces 262 of the retainer elements 260 is illustrated flush with the front face 240a of the rotor 240. However, it may be possible that the retainer elements 260 and/or rotor segments 244 are not flush but protrude from the outer surface 240a. In such a case, a positive effect on cooling can be achieved while the rotor 240 rotates. The protruding portions can act similar to fins creating turbulences in the ambient air, thus improving the heat transfer from the rotor 240 to the air.

FIGS. 14a-14c show a second embodiment of a rotor 240 for an axial flux machine 200, as shown in FIG. 12, as front view (FIG. 14a), as cut view along line 14b-14b (FIG. 14b) and as side view (FIG. 14c).

The arrangement is similar to the arrangement described in FIG. 13a-13c except that the rotor 240 has embedded permanent magnets 250, 252 on both front faces of its magnetic body 214. The positions of the embedded permanent magnets 250, 252 on one rotor 240 are conformed on each side of the rotor 240.

Advantageously, rotors of electric machines comprising the retainer elements can provide higher performance with embedded permanent magnets and partially allow for a reduction of weight and magnetic losses in case the retainer elements are made of or comprise magnetically non-conductive material.

The invention claimed is:

1. A rotor for an electric machine excited by magnetic poles formed by one or more embedded permanent magnets, comprising a magnetic body and the one or more embedded permanent magnets associated with the magnetic body defining first magnetic poles and second magnetic poles of alternating magnetic polarity along a rotor direction, wherein for at least one of the one or more embedded permanent magnets a rotor segment is arranged between the one or more embedded permanent magnets and a first surface of the magnetic body, wherein at least one retainer element connects the rotor segment to a portion of the magnetic body, wherein the rotor segment and/or at least one of the embedded permanent magnets is locked by the at least one retainer element and fixed in a radial or axial position in the magnetic body, and in that a magnetically non-conductive area is assigned to at least one of the one or more embedded permanent magnets, wherein the magnetically non-conductive area is included in the at least one retainer element.

2. The rotor according to claim 1, wherein the at least one retainer element locks the rotor segment and/or the embedded permanent magnet by at least one of (i) form locking (ii) frictional locking or that (iii) the retainer element is integrally joined with the rotor segment.

3. The rotor according to claim 1, wherein the one or more embedded permanent magnets are arranged alternately in a circumferential direction at the magnetic body and defining first magnetic poles and second magnetic poles of alternating magnetic polarity in the circumferential direction and/or that the rotor segment is arranged in a substantially radial direction between the one or more embedded permanent magnets and the first surface (40a) of the magnetic body.

4. The rotor according to claim 1, wherein one or more embedded permanent magnets are stacked in radial direction of the magnetic body with a radial distance to each other.

5. The rotor according to claim 1, wherein the one or more embedded permanent magnets are arranged alternately in, on or at at least one front face of the magnetic body and defining first magnetic poles and second magnetic poles of alternating magnetic polarity on the front face of the magnetic body and/or that the rotor segment is arranged in a substantially axial direction between the one or more embedded permanent magnets and the front surface of the magnetic body.

6. The rotor according to claim 1, wherein the at least one retainer element has an outer edge arranged flush with the first surface of the magnetic body.

7. The rotor according to claim 1, wherein the at least one retainer element is arranged at an outer edge of one or more of the embedded permanent magnets.

8. The rotor according to claim 1, wherein the at least one retainer element is arranged between two adjacent embedded permanent magnets.

9. The rotor according to claim 1, wherein the magnetically non-conductive area at an outer edge of at least one of the embedded permanent magnets comprises an air pocket.

10. The rotor according to claim 1, wherein the at least one retainer element is arranged in an axial slot in the magnetic body.

11. The rotor according to claim 1, wherein the at least one retainer element comprises at least one of carbon fibre, carbon fibre composite, glass fibre, glass fibre composite, polymer fibre, polymer fibre composite, ceramics, plastics.

12. The rotor according to claim 1, wherein the magnetic body is made of at least one of (i) stacked laminates, (ii) iron powder.

13. The rotor according to claim 12, wherein at least one retainer element is made from powder and co-sintered with the magnetic body.

14. The rotor according to claim 1, wherein one or more bandages are provided for supporting retaining the at least one rotor segment at its position at the magnetic body.

15. An electric machine with a stator (20; 220) and being excited by a rotor with magnetic poles formed by one or more embedded permanent magnets, according to anyone of the preceding claims.

16. The electric machine according to claim 15, wherein the rotor being configured for a radial flux machine, an axial flux machine or a linear machine.

17. The electric machine according to claim 15, wherein the rotor for a radial flux machine is being configured as an external rotor surrounding the stator or in that the rotor being configured as an internal rotor surrounded by the stator, or that the rotor for an axial flux machine or for a linear machine is being configured as external rotor with a stator arranged between two external rotors or being configured as an internal rotor enclosed by two stators.

* * * * *